US010607231B1

(12) United States Patent
Cohn et al.

(10) Patent No.: US 10,607,231 B1
(45) Date of Patent: Mar. 31, 2020

(54) SYSTEMS AND METHODS FOR OPTIMIZING TRANSACTION AUTHORIZATION CONVERSION RATE

(71) Applicant: Vantiv, LLC, Symmes Township, OH (US)

(72) Inventors: William H. Cohn, Lexington, MA (US); Sayid Shabeer, Ashland, MA (US); Ned Canning, Boston, MA (US)

(73) Assignee: Worldpay, LLC, Symmes Township, OH (US)

( * ) Notice: Subject to any disclaimer, the term of this patent is extended or adjusted under 35 U.S.C. 154(b) by 360 days.

(21) Appl. No.: 15/717,500

(22) Filed: Sep. 27, 2017

(51) Int. Cl.
*G06Q 20/00* (2012.01)
*G06Q 20/40* (2012.01)

(52) U.S. Cl.
CPC ....... *G06Q 20/409* (2013.01); *G06Q 20/4018* (2013.01)

(58) Field of Classification Search
USPC .......................................................... 705/44
See application file for complete search history.

(56) References Cited

U.S. PATENT DOCUMENTS

| 2008/0162295 A1* | 7/2008 | Bedier | G06Q 20/04 705/26.1 |
| 2015/0046338 A1* | 2/2015 | Laxminarayanan | G06Q 20/38215 705/67 |
| 2017/0140385 A1* | 5/2017 | Dobson | G06Q 20/4016 |

\* cited by examiner

*Primary Examiner* — William E Rankins
(74) *Attorney, Agent, or Firm* — Bookoff McAndrews, PLLC

(57) ABSTRACT

A method for optimizing transaction authorization conversion rates includes retrieving payment transaction parameters and authorization results for a plurality of past payment transactions, generating authorization success factors for each of a plurality of payment transaction parameters based on the retrieved payment transaction parameters and authorization results, receiving, at an acquirer processor, a payment transaction from a merchant, modifying one or more parameters of the payment transaction according to the generated authorization success factors, and submitting the modified payment transaction to a financial institution for processing.

20 Claims, 7 Drawing Sheets

SYSTEMS AND METHODS FOR OPTIMIZING TRANSACTION AUTHORIZATION CONVERSION RATE

TECHNICAL FIELD

Various embodiments of the present disclosure relate generally to the field of electronic transaction processing and, more particularly, to optimizing authorization requests for higher transaction conversion rates.

BACKGROUND

Electronic transactions and networks are used for a great number of purchases and sales between merchants and bank card holders. A normal bank card transaction may involve a number of parties, including an account holder who possesses a card, a merchant, an acquirer processor, an issuer processor, an issuer financial institution, and a card association network. Millions of such transactions occur daily at merchants using a variety of payment card types, such as credit cards, debit cards, prepaid cards, and so forth. A transaction based on account information received from an account holder may be declined for a number of different reasons, such as insufficient funds, card expiration, expired account information, or a variety of other occurrences. However, additional factors, such as the presence or absence of some items of account information, may also affect the rate of acceptance, or conversion, of payment transactions. Declined transactions may lead to a variety of undesirable outcomes for the merchant and the account holder. Conventional methods for submitting electronic transactions may submit such transactions according to factors specific to the acquirer processor or to the merchant, but do not consider factors that might be shown to affect transaction conversion in past transactions.

The present disclosure is directed to overcoming one or more of these above-referenced challenges.

SUMMARY OF THE DISCLOSURE

According to certain aspects of the present disclosure, systems and methods are disclosed for optimizing transaction authorization conversion rates.

In one embodiment, a computer-implemented method is disclosed for optimizing transaction authorization conversion rates. The method includes: retrieving payment transaction parameters and authorization results for a plurality of past payment transactions, generating authorization success factors for each of a plurality of payment transaction parameters based on the retrieved payment transaction parameters and authorization results, receiving, at an acquirer processor, a payment transaction from a merchant, modifying one or more parameters of the payment transaction according to the generated authorization success factors, and submitting the modified payment transaction to a financial institution for processing.

In accordance with another embodiment, a system is disclosed for optimizing transaction authorization conversion rates. The system comprises: a memory having processor-readable instructions stored therein; and a processor configured to access the memory and execute the processor-readable instructions, which when executed by the processor configures the processor to perform a plurality of functions, including functions to: retrieve payment transaction parameters and authorization results for a plurality of past payment transactions, generate authorization success factors for each of a plurality of payment transaction parameters based on the retrieved payment transaction parameters and authorization results, receive, at an acquirer processor, a payment transaction from a merchant, modify one or more parameters of the payment transaction according to the generated authorization success factors, and submit the modified payment transaction to a financial institution for processing.

In accordance with another embodiment, a non-transitory machine-readable medium is disclosed that stores instructions that, when executed by a computer, cause the computer to perform a method for optimizing transaction authorization conversion rates. The method includes: retrieving payment transaction parameters and authorization results for a plurality of past payment transactions, generating authorization success factors for each of a plurality of payment transaction parameters based on the retrieved payment transaction parameters and authorization results, receiving, at an acquirer processor, a payment transaction from a merchant, modifying one or more parameters of the payment transaction according to the generated authorization success factors, and submitting the modified payment transaction to a financial institution for processing.

Additional objects and advantages of the disclosed embodiments will be set forth in part in the description that follows, and in part will be apparent from the description, or may be learned by practice of the disclosed embodiments. The objects and advantages on the disclosed embodiments will be realized and attained by means of the elements and combinations particularly pointed out in the appended claims.

It is to be understood that both the foregoing general description and the following detailed description are exemplary and explanatory only and are not restrictive of the detailed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
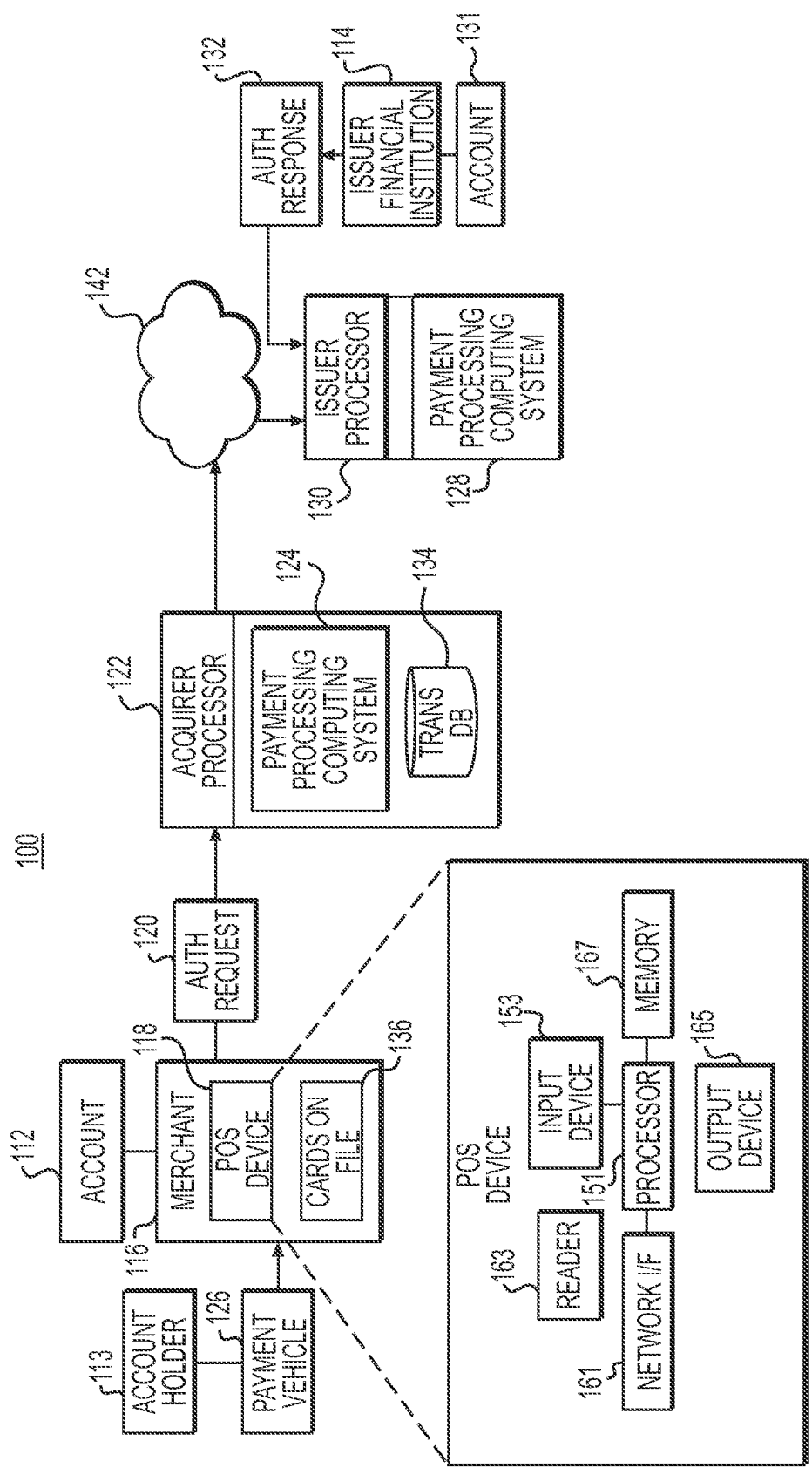
FIG. 1 depicts a block diagram of an example payment system and network in which optimizing transaction authorization conversion rates is performed, according to one or more embodiments.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

Various non-limiting embodiments of the present disclosure will now be described to provide an overall understanding of the principles of the structure, function, and use of systems and methods disclosed herein for the scheduling of transaction payment requests.

For simplicity, the description that follows will be provided by reference to a "payment vehicle," which generally refers to any type of financial alternative to currency. As is to be clear to those skilled in the art, no aspect of the present disclosure is limited to a specific type of payment vehicle. Therefore, it is intended that the following description encompasses the use of the present disclosed techniques with many other forms of financial alternatives to currency, including credit cards, debit cards, smart cards, single-use cards, pre-paid cards, electronic currency (such as might be provided through a cellular telephone or personal digital assistant), and the like. Payment vehicles may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A payment vehicle may also have electronic functionality provided by a network of electronic circuitry that is printed or otherwise incorporated onto or within the payment vehicle (and typically referred to as a "smart card"), or be a fob having a transponder and an RFID reader, or may operate as a mobile wallet or by near field communication (NFC).

As described above, declined transaction payment requests may lead to undesirable outcomes, and associated increased costs, for merchants and account holders. Thus, the embodiments of the present disclosure are directed to improving (i.e., increasing) the successful authorization of transaction payment requests.

In accordance with one or more embodiments, and as described in more detail below, an acquirer processor may maintain a database of past transactions and the associated authorization results. Analysis of these transaction results by statistical methods or other means may be used to determine patterns of acceptance or denial of transaction payment requests based on factors associated with the transactions, including, for example, presence of a billing address, presence of a card verification code (CVV), the merchant categorization code (MCC), presence of an expiration date, etc. The transaction may be modified with respect to these factors, as determined at least in part by such an analysis of historical authorization success rates. According to one or more embodiments, a modified authorization request may be submitted to the payment network.

One or more examples of these non-limiting embodiments are illustrated in the selected examples disclosed and described in detail with reference to FIGS. 1-7 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

FIG. 1 depicts a block diagram of an example payment environment 100 for optimizing transaction authorization conversion rates. In the example payment environment 100, a payment vehicle 126 (e.g., a credit card) may be issued to an account holder 113 by an issuer financial institution 114. Issuer financial institution 114 may be any of a variety of financial institutions that is capable of issuing a payment vehicle to an account holder. Payment vehicle 126 may be used to pay a merchant 116 for a purchase transaction at a merchant point of sale (POS) device 118. Merchant POS device 118 may be any device that facilitates receipt of a payment vehicle for payment of a purchase, such as for example, a POS terminal or a web interface. Further, merchant 116 may be any type of merchant or service provider, such as, for example, a brick-and-mortar merchant, an online merchant, a mobile merchant, a kiosk, or any other type of merchant or device configured to receive payment cards, or electronic or mobile wallets, from account holders as a form of payment.

POS device 118 may be configured to interact with payment vehicle 126 to obtain account information about a consumer account affiliated with account holder 113. As shown in the depicted callout of POS device 118, in one or more embodiments, POS device 118 may include a memory 167 coupled to processor 151, which may control the operations of a reader 163, an input device 153, an output device 165, and a network interface 161. Memory 167 may store instructions for processor 151 and/or data, such as, for example, an identifier that is associated with merchant account 112.

In one or more embodiments, reader 163 may include a magnetic strip reader. In one or more embodiments, reader 163 may include a contactless reader, such as, for example, a radio frequency identification (RFID) reader, a near field communications (NFC) device configured to read data via magnetic field coupling (in accordance with ISO standard 14443/NFC), a Bluetooth transceiver, a Wi-Fi transceiver, an infrared transceiver, a laser scanner, and so forth.

In one or more embodiments, input device 153 may include key buttons that may be used to enter the account information directly into POS device 118 without the physical presence of payment vehicle 126. Input device 153 may be configured to provide further information to initiate a transaction, such as, for example, a personal identification number (PIN), password, zip code, etc., or in combination with the account information obtained from payment vehicle 126. In one or more embodiments, output device 165 may include a display, a speaker, and/or a printer to present information, such as, for example, the result of an authorization request, a receipt for the transaction, an advertisement, and so forth.

In one or more embodiments, network interface 161 may be configured to communicate with acquirer processor 122 such as, for example, via a telephone connection, an Internet connection, or a dedicated data communication channel.

In one or more embodiments, the instructions stored in memory 167 may be configured at least to cause POS device 118 to send an authorization request message to acquirer processor 122 to initiate a transaction. POS device 118 may or may not send a separate request for the clearing and settling of the transaction. The instructions stored in memory 167 also may be configured to cause POS device 118 to perform other types of functions discussed in this description.

In one or more embodiments, POS device 118 may have fewer components than those illustrated in FIG. 1. For example, in one or more embodiments, POS device 118 may be configured for "card-not-present" transactions; and POS device 118 may not have a reader 163. In one or more embodiments, POS device 118 may have more components than those illustrated in FIG. 1.

During a purchase event, merchant POS device 118 may send an authorization request 120 for the purchase transaction to acquirer processor 122 that processes payment vehicle transactions for merchant 116. Additional intermediary entities, such as one or more payment gateways, may assist with the handling and routing of authorization request 120 or other related messaging. For the purposes of illustration, such intermediary entities may be considered part of acquirer processor 122. Authorization request 120 may include identifying information from payment vehicle 126, such as a BIN number, an expiration date, and a first and last name of the account holder, for example. Authorization request 120 may further include identifying information from the purchase, such as an amount and identifying information from merchant POS device 118 and/or merchant 116, for example.

In one or more embodiments, payment vehicle 126 may be used to establish a recurring billing arrangement between account holder 113 and merchant 116. An initial transaction may allow merchant 116 to store account information that may be used for subsequent billing events. The account information may be stored in a cards-on-file storage 136. For example, the purchase event illustrated in FIG. 1 may be associated with a subscription, membership plan, installment payment plan between merchant 116 and account holder 113, and so on. For subsequent transactions, merchant 116 may access cards-on-file storage 136 to retrieve the relevant account information. The subsequent transactions may not require direct involvement from account holder 113. In one or more embodiments, account holder 113 may trigger the subsequent transaction, but may not provide payment vehicle 126 to merchant 116, as merchant 116 may access the cardholder's account information in cards-on-file storage 136.

A payment processing computing system 124 at acquirer processor 122 may receive authorization request 120 from merchant 116. Payment processing computing system 124 may translate authorization request 120, if necessary, and may provide authorization request 120 to a payment network 142. Payment network 142 may be, for example, a network of a credit card association affiliated with payment vehicle 126. Nonlimiting examples of credit card associations include VISA, MASTERCARD, DISCOVER, and AMERICAN EXPRESS, and so on. Authorization request 120 then may be provided to a payment processing computing system 128 at an issuer processor 130. In response to receiving the authorization request, and based on the type of payment vehicle 126, payment processing computing system 128 may provide authorization request 120 to issuer financial institution 114. Using information from authorization request 120, issuer financial institution 114 may associate the purchase transaction with an account 131 of account holder 113 held by issuer financial institution 114. Issuer financial institution 114 then may send an authorization response 132 which may either approve or deny the transaction. Authorization response 132 may be provided to payment processing computing system 128 at issuer processor 130 and then provided to payment network 142. Authorization response 132 then may be provided to payment processing computing system 124 at acquirer processor 122.

Upon receiving authorization response 132, payment processing computing system 124 may send either an approval message or a denial message to merchant POS device 118 to complete the purchase transaction. If the purchase transaction is approved, it may be posted to account holder's account 131 and reconciled later with account holder 113 and merchant 116.

Transaction records may be stored in one or more locations within system 100. In one or more embodiments, the transaction record may be stored within a transaction data database 134 of acquirer processor 122. The transaction data may be received by transaction data database 134 from various sources, such as merchant POS device 118, merchant 116, acquirer processor 122, and so on. A plurality of transaction parameters associated with the purchase transaction may be stored in each transaction record, which may generally be used for settlement and financial recordkeeping. While the transaction parameters stored in each transaction record may vary, example transaction parameters may include, without limitation, account number, card number, payment vehicle information, product information (such as product type, product serial number, and so forth), transaction amount, loyalty account information, merchant information, transaction amount, response code, transaction date, transaction time, whether the transaction was a "card present" transaction, and so on.

Figure 2:
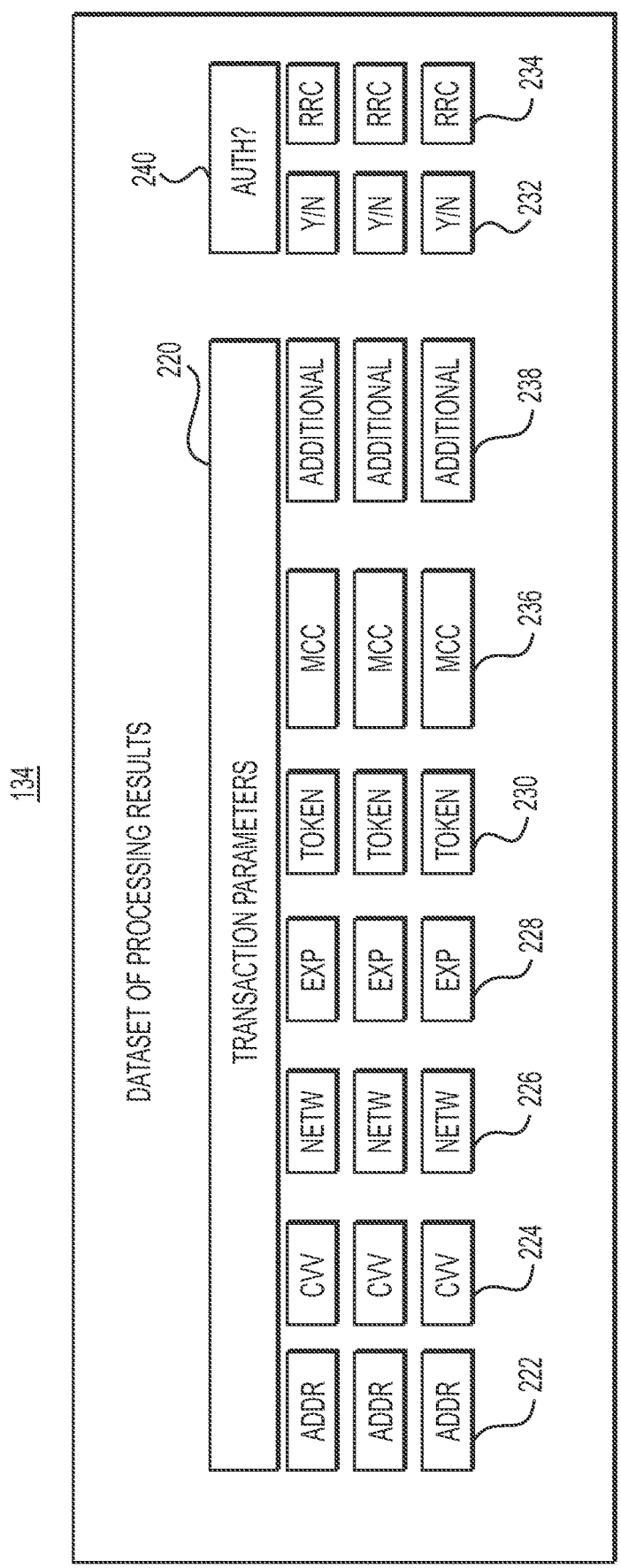
FIG. 2 depicts a dataset of processing results, according to one or more embodiments.
Figure 3:
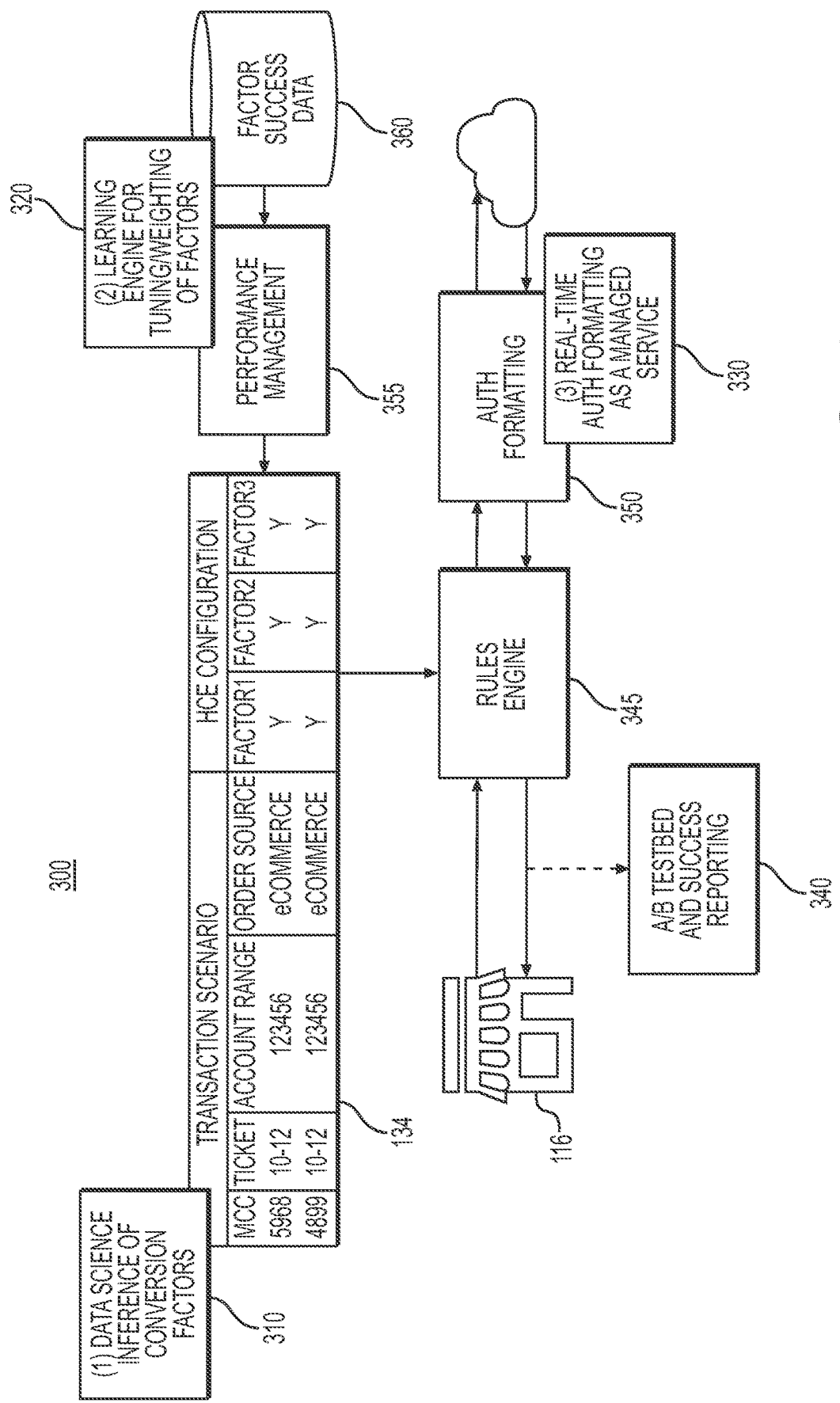
FIG. 3 depicts a block diagram of an example process logic flow for optimizing transaction authorization conversion rates, according to one or more embodiments.

FIG. 2 depicts a dataset of processing results, according to one or more embodiments. Dataset of processing results 134 may include historical transaction information that may be processed and analyzed in order to optimize transaction conversion rates, as shown in FIG. 3 based on, for example, an analysis of trends and/or correlations. Dataset 134 may include transaction parameters 220 such as, for example, a billing address 222, a card verification value (CVV) 224, a payment processing network 226, a payment vehicle expiration date 228, a payment vehicle issuer token 230, a merchant classification code (MCC) 236, and additional parameters 238. Dataset 134 may also include an authorization result 240, which may indicate whether the particular combination of transaction parameters 220 led to an authorization (232) and a reason response code (RRC) related to the authorization result (234). Further, while dataset of processing results 134 may include many different transaction parameters 220, in some embodiments only a subset of the parameters may be used for optimizing transaction authorization conversion rates.

FIG. 3 depicts a block diagram of an example process logic flow for optimizing transaction authorization conversion rates, according to one or more embodiments. As shown in FIG. 3, a process for optimizing transaction authorization conversion rates may include identifying factors for authorization of transaction requests to produce a database of transaction requests 134. For example, such identification may include applying data science methods 310 to database of transaction requests 134. However, other methods may be used such as machine learning, etc. Database of transaction requests 134 may further include information produced by performance manager 355 based on factor success data, possibly in conjunction with a process or generating and updating factor success data 360, such as learning engine 320. Factor success data 360 may aggregate test and control groups. Data stored in factor success data 360 may be used to determine the effectiveness of optimizing transaction requests, such a by comparing results for optimized transactions (test transactions) and non-optimized transactions (control transaction). Such a determination may be specific to particular factors employed for optimization of test transactions. Factor success data may further include measurement, for example, at the level of the specific issuer and account range (generally associated with a card product of a particular issuer), of the sensitivity of a factor. That is, an assessment of whether a manipulation (inclusion, exclusion, alteration) of a factor resulted in an improvement or decrease in the rate of authorization approvals at that issuer/account range. Performance manager 355 may automatically calibrate optimization factors employed by rules engine 345 through analysis of factor success data 360 and transaction scenarios stored in dataset of processing results 134. Performance management may include, for example, the modification of prior rules based on continuing assessment of the results from transactions sent to the issuer/account range. It may include and take into account negative results besides the authorization denial, such as an increase in the rate of chargebacks or fraud alerts generated by the issuer. These negative affects may occur, for example, even if the authorization is approved.

A merchant, such as merchant 116 depicted in FIG. 1, may submit a transaction request, such as authorization request 120 depicted in FIG. 1, to acquirer processor 122. The transaction request may be interpreted by rules engine 345 of the acquirer processor based on the database of transaction requests and the factor success data. The transaction request may be re-formatted by an authorization formatting service, such as authorization formatting service 350 and 330 prior to being submitted to a payment network. Re-formatting of transaction requests may be performed, for example, in batch, in a queue of transaction requests, asynchronously, or in real time as a managed service, such as managed service 330 depicted in FIG. 3, etc. The transaction processing by the acquirer processor may also include a validation and reporting functions, such as A/B testing and reporting of authorization success metrics 340.

Figure 4:
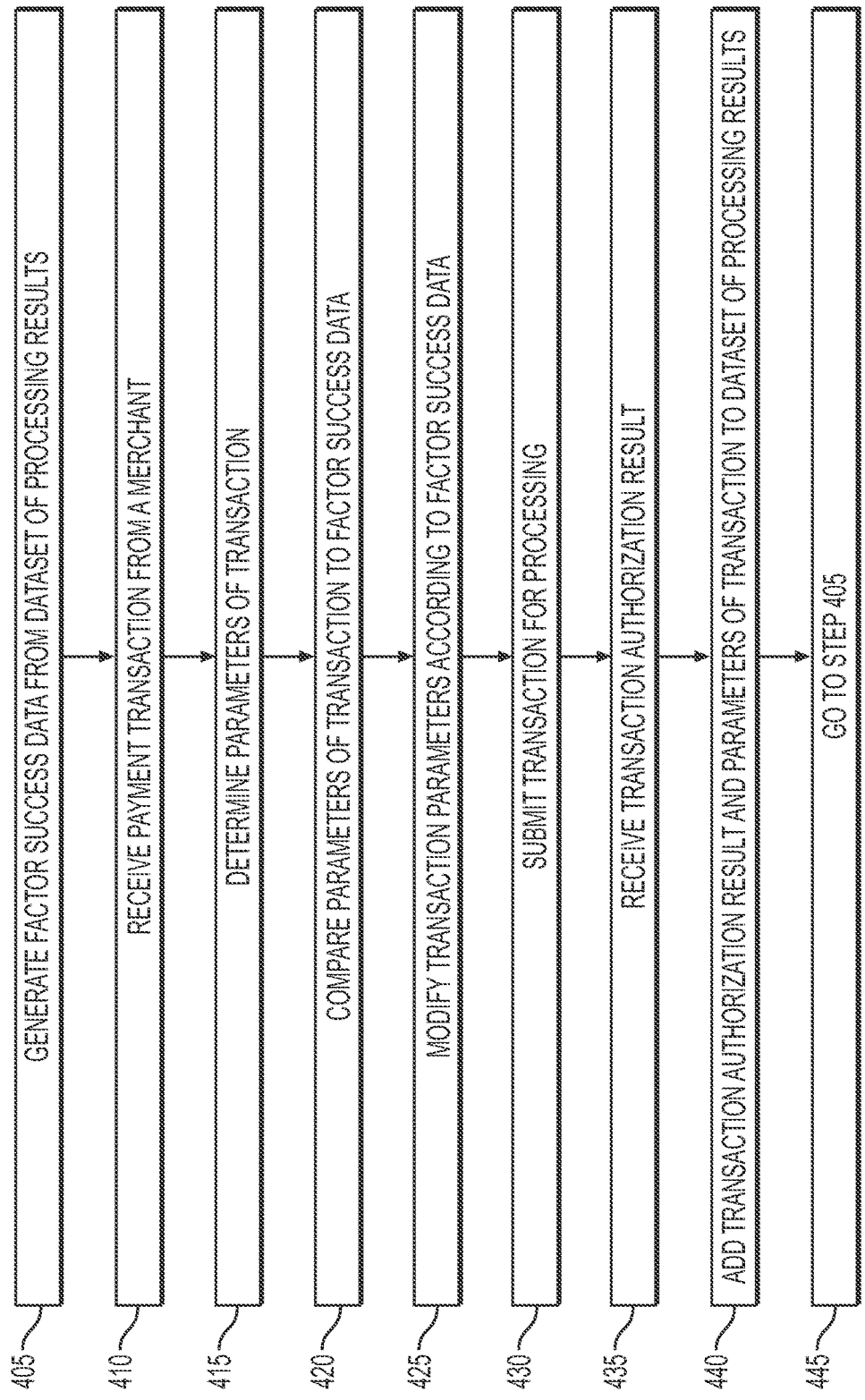
FIG. 4 is a flow chart depicting an example process for optimizing transaction authorization conversion rates, according to one or more embodiments.

FIG. 4 is a flow chart depicting an example process for optimizing transaction authorization conversion rates, according to one or more embodiments. As shown in FIG. 4, at operation 405, acquirer processor 122 may generate factor success data, such as factor success date 360 depicted in FIG. 3, from a dataset of processing results, such as transaction database 134 depicted in FIG. 1. For example, generate factor success data may include applying data science methods, machine learning, or other suitable methods to the dataset of processing results. At operation 410, acquirer processor 122 may receive a payment transaction from a merchant, such as merchant 116 depicted in FIG. 1. The payment transaction may include, in addition to a transaction amount, primary account identifier, customer identification, etc., for example, a billing address, a card verification value (CVV), a payment processing network, a payment vehicle expiration date, a payment vehicle issuer token, a merchant classification code (MCC), and additional parameters. At operation 415, acquirer processor 122 may determine parameters of the payment transaction, such as authorization request 120 depicted in FIG. 1. Determining the parameters of the payment transaction may include identifying parameters that are not present in the transaction, such as the CVV, expiration data, billing address, etc. At operation 420, acquirer processor 122 may compare one or more parameters of the payment transaction to the factor success data. Such comparison may include applying factor weights from the factor success data to the parameters of the transaction. Such factor weights may be determined by any suitable method, including, for example, statistical methods including regression analysis, machine learning, artificial intelligence methods such as neural networks, etc. At operation 425, acquirer processor 122 may modify the parameters of the payment transaction according to the factor success data. At operation 430, acquirer processor 122 may submit the modified transaction for processing by an issuer processor, such as issuer processor 130 depicted in FIG. 1. At operation 435, acquirer processor 122 may receive a transaction authorization result from the issuer processor. At operation 440, acquirer processor 122 may add the transaction authorization result and the parameters of the payment transaction to the dataset of processing results. The process may then resume at operation 405 in order to process subsequent transactions.

Figure 5:
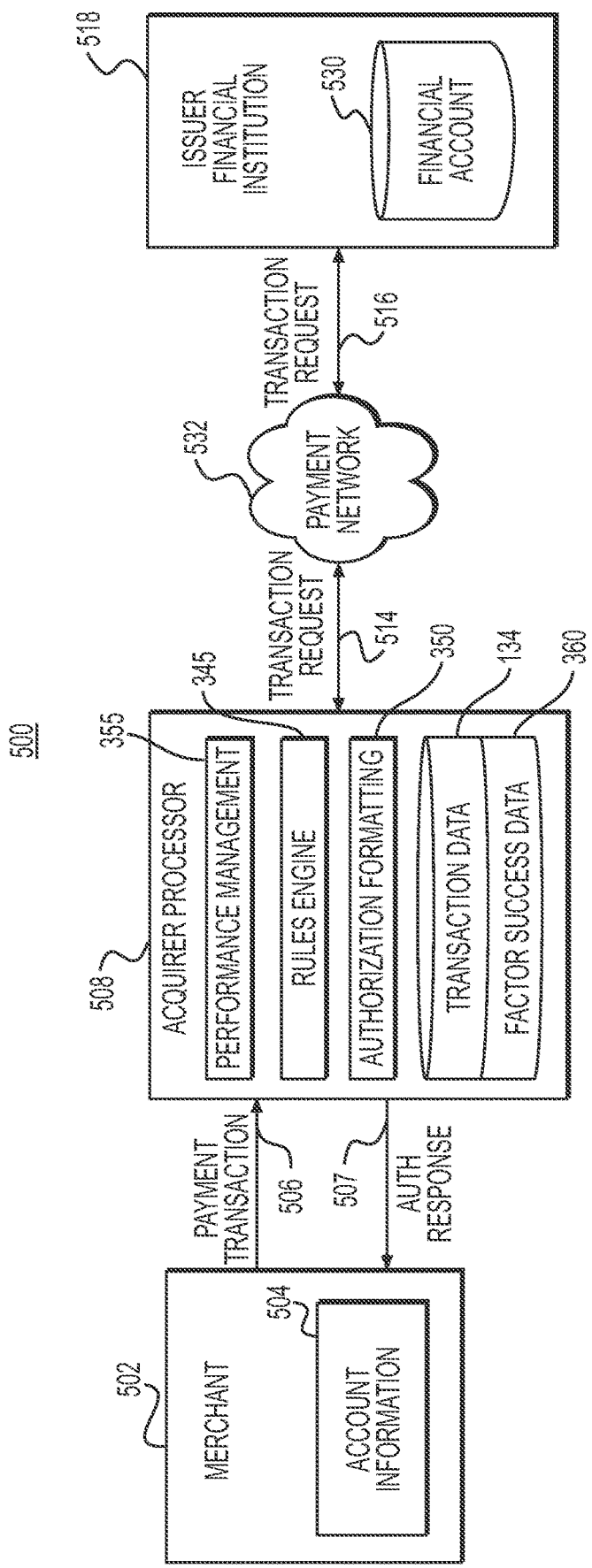
FIG. 5 depicts a block diagram of an example system and process flow for optimizing transaction authorization conversion rates, according to one or more embodiments.

FIG. 5 depicts a block diagram of an example process flow for optimizing transaction authorization conversion rates, according to one or more embodiments. A payment transaction 506 may be received from a merchant 502 by an acquirer processor 508. Payment transaction 506 may be based on account information 504 maintained by merchant 502, or elsewhere, as may be appropriate. Payment transaction 506 may include typical transaction data, such as, for example, an amount, an account identifier, a billing address, a card verification value (CVV), a payment vehicle expiration date, a payment vehicle issuer token, a merchant classification code (MCC), etc. At least some of the transaction data transmitted in the payment transaction may include data that was originally received by merchant 502 during an initial payment transaction originating with a payment vehicle and stored in a cards-on-file storage 136, for example. A payment processing computing system of acquirer processor 508 may determine the card association that is affiliated with the payment transaction 506 (e.g., VISA, MASTERCARD, and so forth), to determine the proper processing channels for the transaction such as, for example, a payment processing network.

Acquirer processor 508 may transmit an authorization attempt or transaction request 514 to a payment network, which in turn may transmit transaction request 516 to an issuer financial institution 518. Issuer financial institution 518 may approve or reject the authorization request based on a status of a financial account 530 associated with the transaction or cardholder, or other factors, such as, for example, the presence or absence of a billing address, the presence or absence of a card verification value (CVV), the presence or absence of a payment vehicle expiration date, the presence or absence of a payment vehicle issuer token, a merchant classification code (MCC), a selection of a payment processing network, etc. Generally, all authorization requests include an MCC, however some merchants view certain MCCs as riskier than others and therefore the selection of which MCC to include in the authorization requests—assuming the merchant qualifies for more than one—can influence the approval. Acquirer processor 508 may communicate the authorization result of transaction request 516 to merchant 502 by, for example, an authorization response 507. Financial account 530 can be any suitable account, such as a DDA account, a gift card account, a prepaid account, or any other type of account that can be linked to or accessed by payment vehicle. The available account balance of financial account 530 may vary over time as the account holder withdraws funds and deposits funds. Transaction requests may be rejected, for example, for reasons associated with financial account 530, such as non-sufficient funds, out-of-date account information, parameters provided with or absent from the transaction request etc. Acquirer processor 508 may store factors associated with transaction request 516 in dataset of processing results 134 that may be used to determine a likelihood of authorization or conversion for subsequent transaction requests. As described above with respect to FIG. 2, factors associated with transaction request 516 may include, for example, billing address 222, card verification value (CVV) 224, payment processing network 226, payment vehicle expiration date 228, payment vehicle issuer token 230, merchant classification code (MCC) 236, additional parameters 238, reason response code (RRC) 234, and so forth. In accordance with one or more embodiments, acquirer processor 508 may, as discussed in greater detail below in reference to FIG. 6, include performance manager 355 and rules engine 345, to process payment transaction 506 based on transaction data 134 and factor success data 360. Acquirer processor 508 may further include an authorization formatting engine 350 to appropriately modify payment transaction 506 based on the processing of payment transaction 506.

Figure 6:
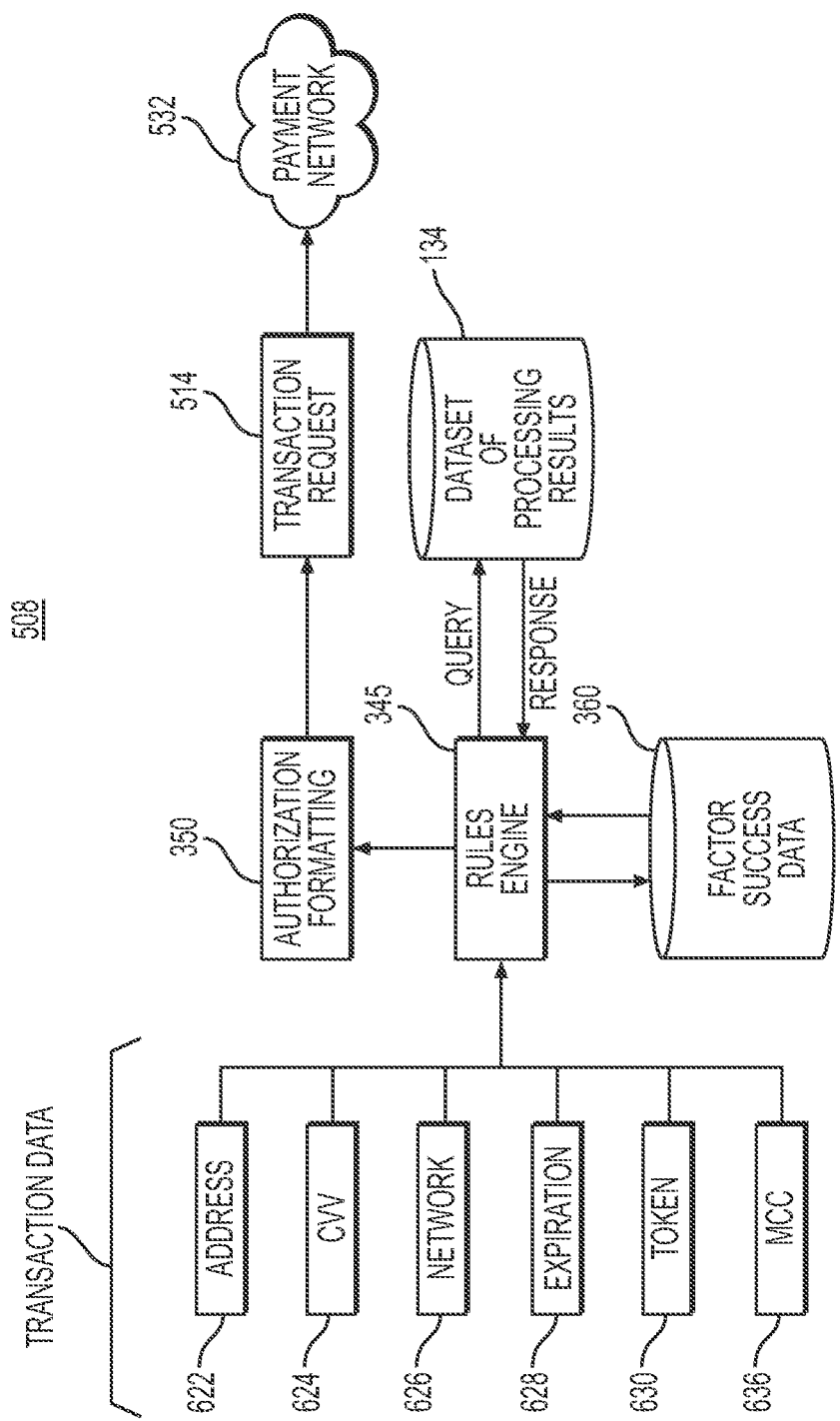
FIG. 6 depicts a block diagram of an example process logic flow and modules for optimizing transaction authorization conversion rates, according to one or more embodiments.

FIG. 6 depicts a block diagram of an example process logic flow and modules for optimizing transaction authorization conversion rates, according to one or more embodiments. As shown in FIG. 6, acquirer processor 508 may receive payment transaction 506. Payment transaction 506 may include transaction data such as, for example, a billing address 622, a card verification value (CVV) 624, a payment processing network 626, a payment vehicle expiration date 628, a payment vehicle issuer token 630, a merchant classification code (MCC) 636. Payment transaction 506 may include additional parameters not shown in FIG. 6. Rules engine 345 of acquirer processor 508 may take in the transaction data for processing. Such processing may include querying dataset of processing results 134 for other potentially corresponding transactions. Rules engine 345 may further read factor success metrics from factor success data 360. Based on the corresponding transaction data received from dataset of processing results 134 and the factor success metrics from factor success data 360, rules engine 345 may determine that the likelihood of obtaining authorization for payment transaction 506 from issuer financial institution 518 may be improved by altering the presentation of one or more aspects of the transaction data. For example, rules engine 345 may determine that presentation of payment transaction 506 without billing address information may improve the likelihood of obtaining authorization. In particular, transaction data received from dataset of processing results 134 and the factor success metrics from factor success data 360 may indicate that the issuer financial institution 518 may issue two responses: one indicating overall approval or denial, and one indicating whether a supplied billing address matches a billing address on file with the issuer financial institution 518. If issuer financial institution 518 is known to authorize transactions lacking a billing address and deny transactions having a mismatched address, then presenting payment transaction 506 without billing address 622 may improve the likelihood of obtaining authorization. Similarly, transaction data received from dataset of processing results 134 and the factor success metrics from factor success data 360 may indicate that omitting CVV 624 or expiration date 628 when presenting payment transaction 506 may improve the likelihood of obtaining authorization. In addition, a merchant may qualify for multiple different MCCs based on the nature of the businesses conducted by the merchant. Transaction data received from dataset of processing results 134 and the factor success metrics from factor success data 360 may indicate that one of the available MCCs may have a greater likelihood of obtaining authorization. Rules engine 345 may, accordingly, present payment transaction 506 with the MCC with the greatest likelihood of obtaining authorization. Likewise, transaction request 506 may have multiple payment networks 532 available for submission to issuer financial institution 518 for processing. Transaction data received from dataset of processing results 134 and the factor success metrics from factor success data 360 may indicate that one of the available payment networks 532 may yield a greater likelihood of obtaining authorization. Rules engine 345 may, accordingly, select the payment network with the greatest likelihood of obtaining authorization. Finally, some payment vehicles may have transaction tokens available associated with prior authorization of payment transactions or including encrypted payment or authorization credentials. Presentation of payment transaction 506 with such a token may improve the likelihood of obtaining authorization. Where transaction data received from dataset of processing results 134 and the factor success metrics from factor success data 360 indicate that presentation of a token may improve the likelihood of obtaining authorization, rules engine 345 may include an available token with transaction request 506.

Upon completing the processing of payment transaction, rules engine 345 may invoke authorization formatting engine 350 to appropriately modify payment transaction 506 based on the processing of payment transaction 506. Authorization formatting engine 350 may generate a modified transaction request 514 to be submitted to issuer financial institution 518 by way of payment network 514.

Figure 7:
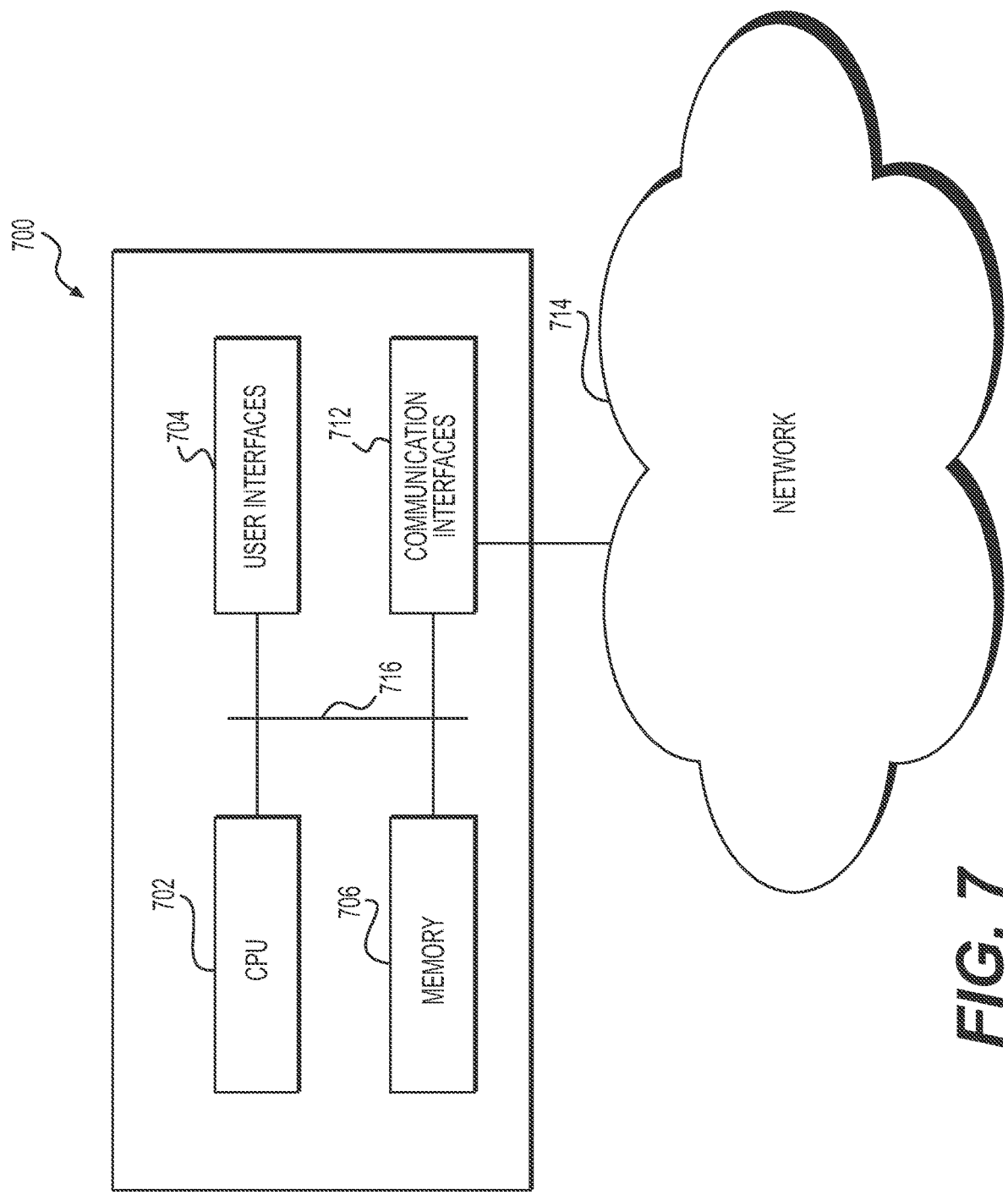
FIG. 7 depicts a computing device for optimizing transaction authorization conversion rates, according to one or more embodiments.

The processes described herein may be performed on or between one or more computing devices that are specially configured to perform the processing described herein. Referring now to FIG. 7, an example computing device 700 is presented. A computing device 700 may be, for example, a server, a computing device that is integrated with other systems or subsystems, a mobile computing device, a cloud-based computing capability, and so forth. The computing device 700 can be any suitable computing device as would be understood in the art, including without limitation, for example, a custom chip, an embedded processing device, a tablet computing device, a POS device 118, a payment processing computing system 124, a payment processing computing system 128, a personal data assistant (PDA), a desktop, a laptop, a microcomputer, a minicomputer, a server, a mainframe, or any other suitable programmable device. According to one or more embodiments, a single component can be replaced by multiple components and multiple components can be replaced by a single component to perform a given function or functions. Except where such substitution would not be operative, such substitution is within the intended scope of the one or more embodiments.

The computing device 700 may include a processor 702 that may be any suitable type of processing unit such as, for example, a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources may further include, for example, distributed computing devices, cloud computing resources, and virtual computing resources in general, etc.

The computing device 700 also may include one or more memories 706 such as, for example, read only memory (ROM), random access memory (RAM), cache memory associated with the processor 702, or other memories such as dynamic RAM (DRAM), static ram (SRAM), programmable ROM (PROM), electrically erasable PROM (EE-PROM), flash memory, a removable memory card or disk, a solid state drive, and so forth. The computing device 700 also may include storage media such as, for example, a storage device that can be configured to have multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewriteable (CD-RW), a suitable type of Digital Versatile Disk (DVD) or BluRay disk, and so forth. Storage media such as flash drives, solid state hard drives, redundant array of individual disks (RAID), virtual drives, networked drives and other memory means including storage media on the processor 702, or memories 706 are also contemplated as storage devices. It can be appreciated that such memory can be internal or external with respect to operation of the disclosed embodiments. It can be appreciated that certain portions of the processes described herein may be performed using instructions stored on a non-transitory computer-readable medium or media that direct a computer system to perform the process steps. Non-transitory computer-readable media, as used herein, comprises all computer-readable media except for transitory, propagating signals.

Network and communication interfaces 712 may be configured to transmit to, or receive data from, other computing devices 700 across a network 714. The network and communication interfaces 712 may be, for example, an Ethernet interface, a radio interface, a Universal Serial Bus (USB) interface, or any other suitable communications interface and can include receivers, transmitter, and transceivers. For purposes of clarity, a transceiver may be referred to as a receiver or a transmitter when referring to only the input or only the output functionality of the transceiver. Example communication interfaces 712 may include, for example, wired data transmission links such as Ethernet and TCP/IP. The communication interfaces 712 may include, for example, wireless protocols for interfacing with private or public networks 714. For example, the network and communication interfaces 712 and protocols may include interfaces for communicating with private wireless networks such as, for example, a Wi-Fi network, one of the IEEE 802.11x family of networks, or another suitable wireless network. The network and communication interfaces 712 may include interfaces and protocols for communicating with public wireless networks 712, using, for example, wireless protocols used by cellular network providers, including Code Division Multiple Access (CDMA) and Global System for Mobile Communications (GSM), etc. A computing device 700 may use network and communication interfaces 712 to communicate with hardware modules such as, for example, a database or data store, or one or more servers or other networked computing resources. Data may be encrypted or protected from unauthorized access.

According to one or more embodiments, the computing device 700 may include a system bus 716 for interconnecting the various components of the computing device 700, or the computing device 700 may be integrated into one or more chips such as, for example, a programmable logic device or an application specific integrated circuit (ASIC), etc. The system bus 716 may include, for example, a memory controller, a local bus, or a peripheral bus for supporting input and output devices 704, and communication interfaces 712, etc. Example input and output devices 704 may include keyboards, keypads, gesture or graphical input devices, motion input devices, touchscreen interfaces, one or more displays, audio units, voice recognition units, vibratory devices, computer mice, and any other suitable user interface.

The processor 702 and memory 706 may include non-volatile memory for storing, for example, computer-readable instructions, data, data structures, program modules, code, microcode, and other software components for storing the computer-readable instructions in non-transitory computer-readable mediums in connection with the other hardware components for carrying out the methodologies described herein. Software components may include, for example, source code, compiled code, interpreted code, executable code, static code, dynamic code, encrypted code, or any other suitable type of code or computer instructions implemented using any suitable methodology including, for example, high-level, low-level, object-oriented, visual, compiled, or interpreted programming language, etc.

These and other embodiments of the systems and methods may be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

It is intended that the specification and examples be considered as exemplary only, with a true scope and spirit of the invention being indicated by the following claims.

What is claimed is:

1. A method for optimizing transaction authorization conversion rates, comprising:
    retrieving payment transaction parameters and authorization results for a plurality of past payment transactions from a database;
    generating authorization success factors for each of a plurality of payment transaction parameters based on the retrieved payment transaction parameters and authorization results;
    receiving, at an acquirer processor, a payment transaction from a merchant;
    modifying one or more parameters of the payment transaction according to the generated authorization success factors; and
    submitting the modified payment transaction to a financial institution for processing.

2. The method of claim 1, further comprising:
    receiving a payment transaction authorization result for the submitted modified payment transaction; and
    adding the received payment transaction authorization result and the parameters of the modified payment transaction to a database of payment transaction processing results.

3. The method of claim 1, wherein the modifying one or more parameters of the payment transaction further comprises:
    comparing the parameters of the payment transaction to the generated authorization success factors; and
    modifying each parameter of the payment transaction where the generated authorization success factors indicate a greater likelihood of authorization of the payment transaction.

4. The method of claim 1, wherein the payment transaction parameters comprise one or more of a billing address, a card verification value (CVV), a payment processing network, a payment vehicle expiration date, a payment vehicle issuer token, and a merchant classification code (MCC).

5. The method of claim 4, wherein the authorization success factors include the absence of one or more of the billing address, the CVV, and the payment vehicle expiration date.

6. The method of claim 4, wherein:
    the merchant is associated with a plurality of MCCs, and
    the authorization success factors indicate a likelihood of authorization of the payment transaction associated with each MCC among the plurality of MCCs.

7. The method of claim 4, wherein:
    a plurality of payment networks are available for submitting the modified payment transaction for processing, and
    the authorization success factors indicate a likelihood of authorization of the payment transaction associated with each payment network among the plurality of payment networks.

8. The method of claim 4, wherein the modifying one or more parameters of the payment transaction comprises providing a payment vehicle issuer token.

9. A non-transitory computer readable medium storing a program causing a computer to execute a method of optimizing transaction authorization conversion rates, the method comprising:
    retrieving payment transaction parameters and authorization results for a plurality of past payment transactions;
    generating authorization success factors for each of a plurality of payment transaction parameters based on the retrieved payment transaction parameters and authorization results;
    receiving, at an acquirer processor, a payment transaction from a merchant;
    modifying one or more parameters of the payment transaction according to the generated authorization success factors; and
    submitting the modified payment transaction to a financial institution for processing.

10. The non-transitory computer readable medium of claim 9, wherein the payment transaction parameters comprise one or more of a billing address, a card verification value (CVV), a payment processing network, a payment vehicle expiration date, a payment vehicle issuer token, and a merchant classification code (MCC).

11. The non-transitory computer readable medium of claim 10, wherein the authorization success factors include the absence of one or more of the billing address, the CVV, and the payment vehicle expiration date.

12. The non-transitory computer readable medium of claim 10, wherein:
the merchant is associated with a plurality of MCCs, and
the authorization success factors indicate a likelihood of authorization of the payment transaction associated with each MCC among the plurality of MCCs.

13. The non-transitory computer readable medium of claim 10, wherein:
a plurality of payment networks are available for submitting the modified payment transaction for processing, and
the authorization success factors indicate a likelihood of authorization of the payment transaction associated with each payment network among the plurality of payment networks.

14. The non-transitory computer readable medium of claim 10, wherein the modifying one or more parameters of the payment transaction comprises providing a payment vehicle issuer token.

15. A computing system for optimizing transaction authorization conversion rates, the computing system comprising a non-transitory computer readable medium having instructions stored thereon which when executed by a processor cause the processor to:
retrieve payment transaction parameters and authorization results for a plurality of past payment transactions;
generate authorization success factors for each of a plurality of payment transaction parameters based on the retrieved payment transaction parameters and authorization results;
receive, at an acquirer processor, a payment transaction from a merchant;
modify one or more parameters of the payment transaction according to the generated authorization success factors; and
submit the modified payment transaction to a financial institution for processing.

16. The system of claim 15, wherein the payment transaction parameters comprise one or more of a billing address, a card verification value (CVV), a payment processing network, a payment vehicle expiration date, a payment vehicle issuer token, and a merchant classification code (MCC).

17. The system of claim 16, wherein the authorization success factors include the absence of one or more of the billing address, the CVV, and the payment vehicle expiration date.

18. The system of claim 16, wherein:
the merchant is associated with a plurality of MCCs, and
the authorization success factors indicate a likelihood of authorization of the payment transaction associated with each MCC among the plurality of MCCs.

19. The system of claim 16, wherein:
a plurality of payment networks are available for submitting the modified payment transaction for processing, and
the authorization success factors indicate a likelihood of authorization of the payment transaction associated with each payment network among the plurality of payment networks.

20. The system of claim 16, wherein the modifying one or more parameters of the payment transaction comprises providing a payment vehicle issuer token.

* * * * *